May 16, 1967  C. R. SILLS  3,319,371
FISH LURE
Filed Sept. 28, 1964  4 Sheets-Sheet 1
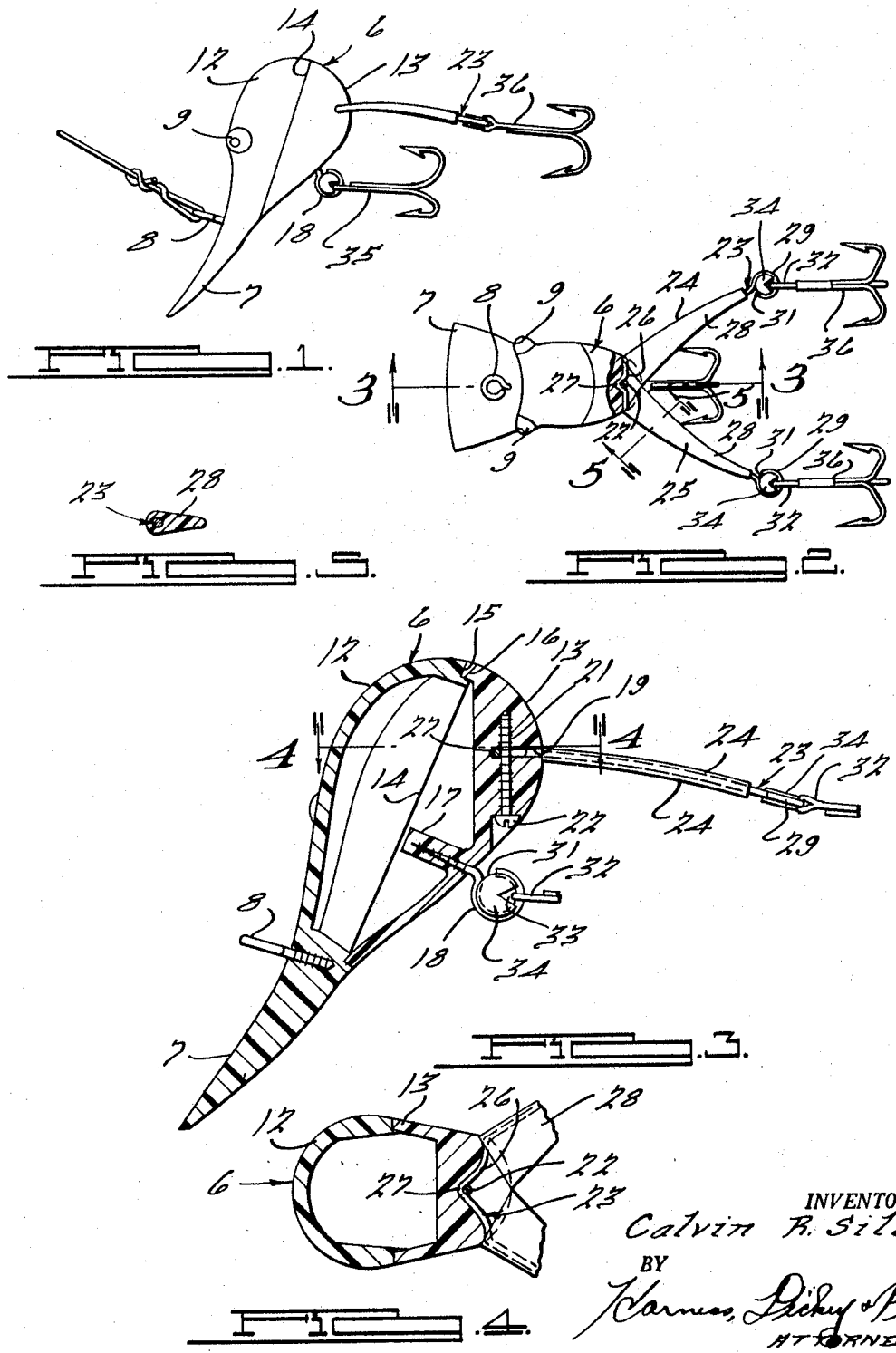
INVENTOR.
Calvin R. Sills.
BY
Harness, Dickey & Pierce.
ATTORNEYS.

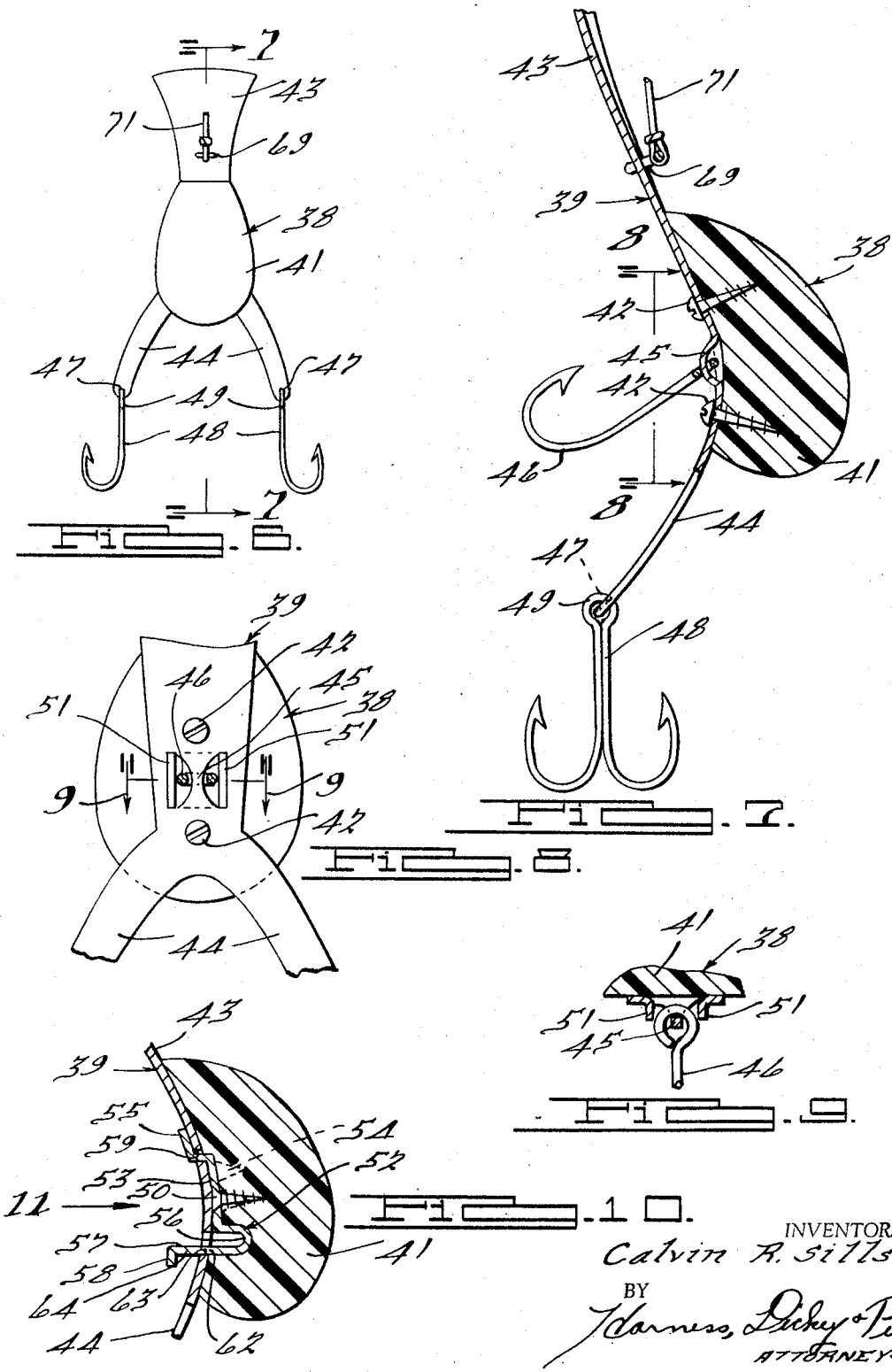

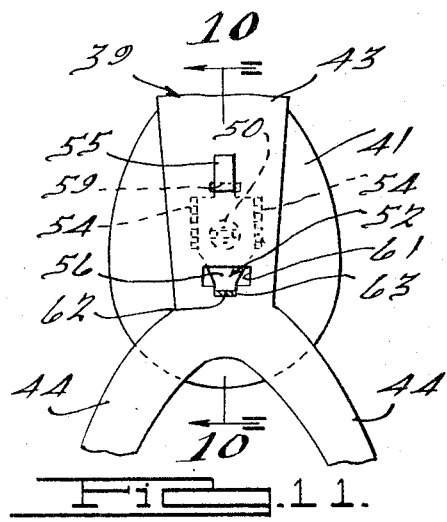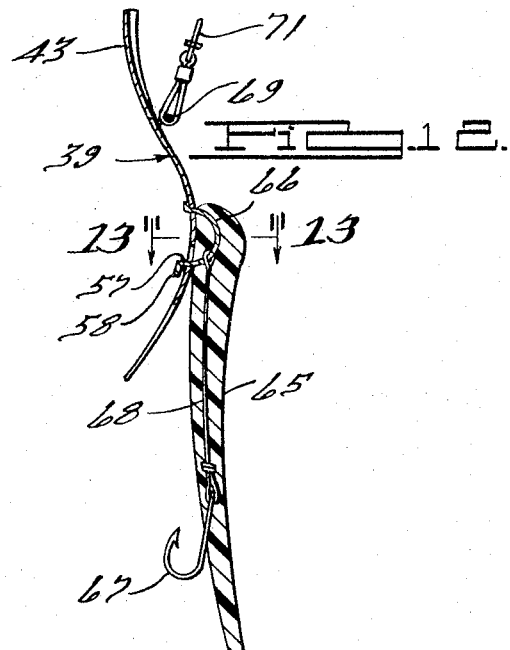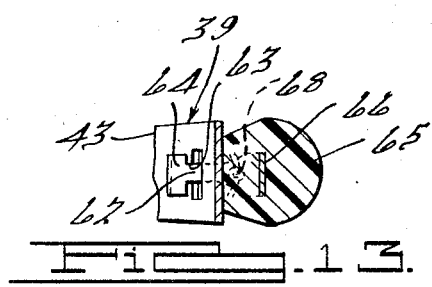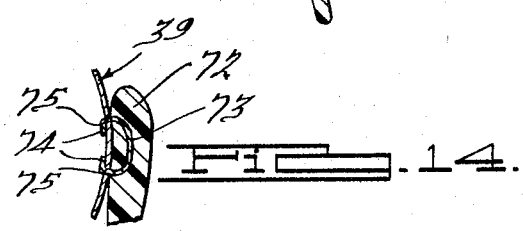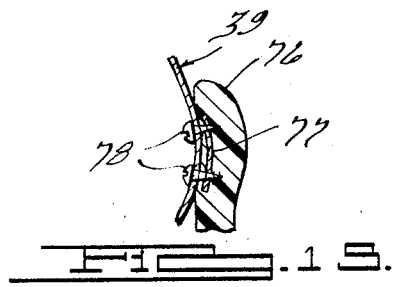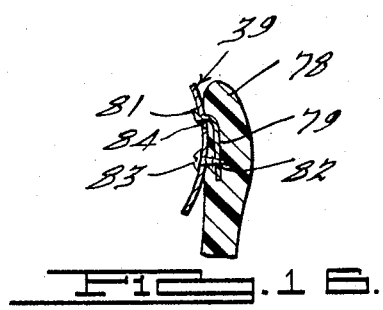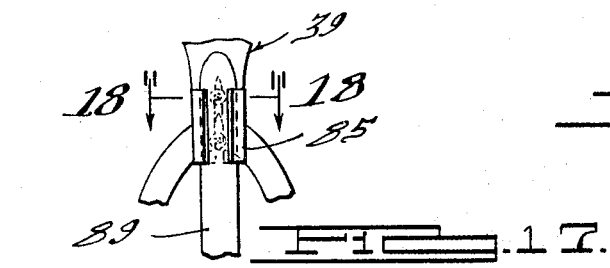

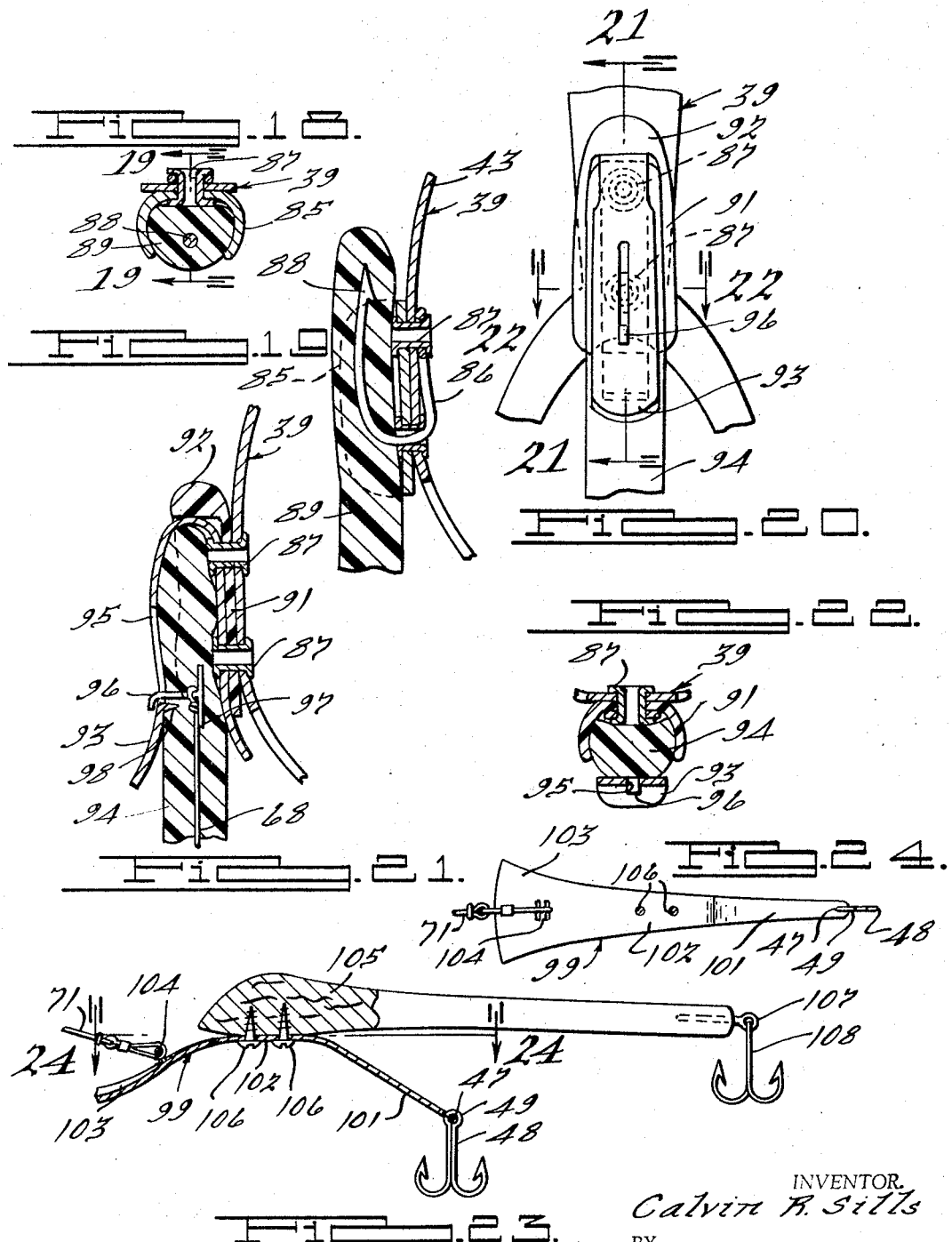

United States Patent Office 3,319,371
Patented May 16, 1967

3,319,371
FISH LURE
Calvin R. Sills, 3969 N. River Road, Port Huron, Mich. 48060; Arthur T. Kinnee, administrator of said Calvin R. Sills, deceased
Filed Sept. 28, 1964, Ser. No. 402,685
4 Claims. (Cl. 43—42.09)

This invention relates to fish lures, and particularly to a casting or trolling lure of froglike design and is a continuation-in-part of application Ser. No. 114,912, filed June 5, 1961 for Fish Lure, and now abandoned.

The primary object of the invention is to provide a lure having a head, body, legs, hooks and screw eyes so proportioned and balanced that a swift counterrotating action is produced when the lure is drawn through the water.

Another object of the invention is to provide the body portion of a lure with widely spaced leglike projections carrying triple hooks so positioned as to hook fish that frequently strike short of the lure due to the swift alternating rotation of the head, body and legs which cover a large area to the rear of the lure.

A further object of the invention is to provide a lure that has a normal shape and appearance, so proportioned as to provide a maximum action to attract game fish when the lure is drawn through the water.

A still further object of the invention is to provide a novel rotary lock which is quickly and easily operated to remove and replace hooks without the use of tools.

A still further object of the invention is to provide a lure with a hollow body and diverging legs so balanced as to sink slowly when cast upon the water to a desired depth when normal trolling speed will maintain the depth until the line is drawn upwardly at a sharp angle.

A still further object of the invention is to provide a lure body with hook carrying diverging legs at the rear and a central hook or group of hooks therebelow to which natural bait may be secured to trail rearwardly below and between the hooks on the diverging legs located thereabove.

A still further object of the invention is to provide a fish lure having a buoyant body secured to a Y-shaped base element which has a downwardly sloping bill extending forwardly of the body and diverging legs extending rearwardly thereof.

A still further object of the invention is to secure any one of a plurality of bodies of different color, shape and length to a Y-shaped base element by releasable clamping element.

Still another object of the invention is to secure an elongated body of buoyant elastomeric material to the Y-shaped base element by means to which a lead is attached which passes through the body and is secured to a hook extending outwardly thereof.

It is the general object of the invention to use the Y-shaped base element which controlling the movement of the lure for releasably supporting many types of bait bodies.

Other objects and features of novelty of the invention will be specifically pointed out or will become apparent when referring, for a better understanding of the invention, to the following description taken in conjunction with the accompanying drawing, wherein:

FIGURE 1 is a view in elevation of a fish lure of the present invention in a position simulating that when being drawn through the water;

FIG. 2 is a plan view of the lure illustrated in FIG. 1, with a part in section;

FIG. 3 is an enlarged sectional view of the structure illustrated in FIG. 2, taken on the line 3—3 thereof;

FIG. 4 is a broken sectional view of the structure illustrated in FIG. 3 taken on the line 4—4 thereof;

FIG. 5 is an enlarged sectional view of the structure illustrated in FIG. 2, taken on the line 5—5 thereof;

FIG. 6 is a plan view of structure, similar to that illustrated in FIG. 2, showing a further form of the invention;

FIG. 7 is an enlarged sectional view of the structure illustrated in FIG. 6, taken on the line 7—7 thereof;

FIG. 8 is an enlarged sectional view of the structure illustrated in FIG. 7 taken on the line 8—8 thereof;

FIG. 9 is an enlarged broken sectional view of the structure illustraed in FIG. 8, taken on the line 9—9 thereof;

FIG. 10 is a sectional view of the structure illustrated in FIG. 11, taken on the line 10—10 thereof;

FIG. 11 is a view of structure, similar to that illustrated in FIG. 8, showing a further form of the invention, FIG. 12 is a view of structure, similar to that illustrated in FIGS. 7 and 10, showing a still further form which the invention may assume;

FIG. 13 is an enlarged sectional view of the structure illustrated in FIG. 12, taken on the line 13—13 thereof;

FIG. 14 is a broken view of structure, similar to that illustrated in FIG. 12, showing a further form of the invention;

FIG. 15 is a view of structure, similar to that illustrated in FIG. 14, showing a still further form of the invention;

FIG. 16 is a view of structure, similar to that illustrated in FIG. 15, showing a still further form which the invention may assume;

FIG. 17 is a view of structure, similar to that illustrated in FIG. 8, showing a still further form of the invention;

FIG. 18 is an enlarged sectional view of the structure illustrated in FIG. 17, taken on the line 18—18 thereof;

FIG. 19 is a broken sectional view of the structure illustrated in FIG. 18, taken on the line 19—19 thereof;

FIG. 20 is a view of structure, similar to that illustrated in FIG. 17, showing another form which the invention may assume;

FIG. 21 is a sectional view of the structure illustrated in FIG. 20, taken on the line 21—21 thereof;

FIG. 22 is a sectional view of the structure illustrated in FIG. 20, taken on the line 22—22 thereof;

FIG. 23 is a view of structure, similar to that illustrated in FIG. 12, showing still another form of the invention; and FIG. 24 is a section view of the structure illustrated in FIG. 23, taken on the line 24—24 thereof.

Referring to the figures, the body of the lure has an oval-shaped head portion 6 which extends downwardly to form a wide bill portion 7 containing a screw eye 8 which is horizontally disposed and located inwardly from the end of the bill portion. Above the screw eye 8, a pair of protuberances 9 extends outwardly from the forward portion of the oval-shaped head 6 for simulating eyes and for the purpose of controlling the deflection of water from the wide bill portion 7 as it passes upwardly thereover. The head portion 6 is hollow, necessitating the body to be made in two parts. This may be accomplished by a central plane through the length of the body between the eyes, dividing the head and bill portion into right and left-hand sections. Since, however, all of the screws are disposed on the center line of the head, it is desirable to make the front portion of the head as one casting and the rear portion of the head as a second casting. The front casting 12 is separated from the rear casting 13 along a line 14, as illustrated in FIGS. 1 and 3. A shoulder 15 may be provided along the rear open edge of the casting 12, while a flange 16 is provided forwardly on the rear casting 13 which mates within the shoulder portion 15. The two portions are sealed thereto by a sealing means known in the trade to be suitable for the material of the castings 12 and 13.

The edges of the projecting shoulder portion 15 and the projection 16 are so designed as to be readily separated from the molds along with a projection 17 extending inwardly of the casting 13 for the purpose of receiving the screw end of a screw eye 18. A slot 19 extends inwardly from the rear of the casting 13 normal to an aperture 21 for a screw 22 which projects through the slot. The rearwardly extending portions of the wire 23 form legs 24 and 25 joined to a transverse wire portion 26. The transverse wire portion 26 has a V-shaped portion 27 which extends inwardly of the screw 22 and retains the wire 23 and therefore the legs 24 and 25 fixed to the rear portion of the head 6. The wires of the legs are covered with a rubber, plastic or similar material 28 which act as vanes for stabilizing the lure as it is drawn through the water.

The ends of the legs 24 and 25 are formed into eyes 29 which are similar to the screw eye 18 hereinabove referred to. The end of the wire forming the eye 29 is spaced at 31 from the main body thereof for receiving the eye 32 of a single or multiple hook 36. One side of the eye 32 is disposed within a pie-shaped recess 33 of a disk 34 which has a peripheral recess to receive the inner peripheral portion of the eye which permits it to be rotated therein. When the pie-shaped recess 33 is opposite to the space 31, the eye 32 of the hook may be insereted through the space 31 into the pie-shaped recess when threading the eye 32 onto the wire of the eye 29. Thereafter, the disk is rotated to move the recess 33 away from the space 31, as clearly illustrated in the figures, to lock the eye 32 of the hook in fixed position on the eye 29 of the wire. When the hook is to be removed, it is only necessary to rotate the disk 34 until the pie-shaped recess 33 is opposite to the space 31 which releases the eye 32 and permits it and the hook to be removed and another hook to be attached. When a single or a tandem hook 35 is supported by the eye 18 it will be below the legs 24 and 25 and may be used for supporting a minnow, worm or other natural bait. This will add further attraction to the lure and make it more successful for catching a fish if the fish strike at the natural bait. Even though the fish refuse to take the bait, there is a favorable chance of having the tandem hooks 36 on the legs 24 and 25 snare the fish in the face, gill or body because of the active movement of the lure. The lure will move switfly back and forth from side to side when drawn through the water with or without the natural first food attached thereto.

The body shape having the wide bill extending downwardly from the hollow oval-shaped head from which the diverging legs extend provides a stabilizing effect to maintain the lure in an upright position. When the bait is cast upon the water, it will assume a position slightly inclined rearwardly from the vertical as illustrated in FIGURES 1 and 3, and will sink slowly at a fixed rate. The balance of the weight of the material and the hollow head portion will maintain the lure in this position throughout trolling. After a lapse of a desired amount of time, judged by prior observations, the lure will reach a depth at which trolling is desired, whereupon the line can be taken in in the normal manner to produce the action of the bait at a desired depth of water. The balanced position of the body and legs, together with the horizontal disposition of the screw eye 8, produces a swift reversing action and movement to the lure when it is drawn through the water. This back and forth movement is sufficiently fast to make the two legs appear as a blurred continuation when the speed of the drawn lure is equal to the normal retrieving speed used by the average fisherman. The eyes and forward portion of the head also indicate multiple features in a like manner. This action, combined with the widespread position of the legs, is designed for the taking of game fish, such as black bass, pickerel, northern pike and similar species where lifelike action is appealing to the game fish which has its curiosity aroused by the new shape of the lure and its grotesque maneuvers within the water. With the hooks spread apart at a substantial distance in the rear, the vigorous arcuate back and forth movement will snag the fish in the body, gills or head when attempting to roll or strike the lure without actually contacting it. The symmetrical shape of the head, body and legs on a longitudinal axis provides equal disposition of the weight, resulting in equal side movements to the left and right when drawn through the water. The horizontal disposition of the screw eye 8 on the center line of the head maintains the line always centered thereon so that a direct pull on the line will always result in a balanced relation each side of the central plane through the lure.

The hooks need not be attached to the eyes 18 and 29, to save assembly cost, since the furnished hook can be readily attached to such eyes by the purchaser. In view of the ease of removing the hooks from the eyes, they may be removed when the bait is stored in a box, thereby preventing the tangling of the hooks which otherwise will occur. With the rotary lock arrangement, a single, weedless, triple or other kind of hook may be employed on the lure to meet the desire of the fisherman.

Any type of plastic known in the art to be suitable may be employed for molding, pressing or otherwise producing the portions of the bait which are accurately mated to each other. The bait may be painted or the plastic colored to any desired tint or shade and may be speckled or striped or otherwise designed, as is well known in the trade.

As the lure is drawn through the water with the fishing line attached to the horizontal screw eye 8, it will begin to oscillate, with one leg swinging outwardly and the other leg extending to be in the rear of the head 6. The force of the water on the outwardly swung leg will cause it to swing to a position back of the head and the other leg to swing outwardly thereof. This alternate swinging movement of the legs is substantial so that the pair of hooks on the ends of the legs 24 and 25 will move through a wide path and will provide an unusual appearance to a fish, thereby substantially increasing the possibility of the fish striking at the lure.

The fish lure 38 illustrated in FIGS. 6 through 9 has substantially the same shape and action as the lure illustrated in FIGS. 1 to 5. A metal base element 39 of Y-shape has a buoyant body 41 secured thereto by various means herein illustrated, as by screws 42. The base element has a forward projecting bill 43 which extends downwardly from the body 41 and is wider and concave at its outer end. The rear end of the base element has diverging legs or appendages 44 which extend downwardly from the body 41 at a substantial angle to the bill portion 43. Centrally of the base element beneath the body 41, a web 45 is lanced from the element and deflected outwardly to form an eye to which a single or multiple hook 46 is secured. The ends of the appendages are provided with apertures 47 for supporting hooks 48 which may be a multiple of any number of barbs. A two-barb hook is illustrated herein, one barb of which may be passed through the aperture until the eye portion 49 is pivotally supported by the end portion of the appendages.

As illustrated in FIGS. 8 and 9, the web 45 when lanced has the side portions 51 bent outwardly and disposed in parallel relation on opposite sides of the web for preventing the barbs from striking the body 41 when the hook swings to the right or left on the web. The body 41 may be made of any buoyant material, such as wood or various types of plastic or other material, one plastic which has proven satisfactory is that procurable in the trade under the name "Dylite." This material provides a desired buoyancy and will float the bait or permit it to sink at a controlled rate through the selection of the size of the body which is attached to the Y-shaped base element.

Referring to FIGS. 10 and 11, the body 41 is illustrated as having an attaching clip 52 secured thereto. Opposite edges of the web 53 of the clip has upstanding tangs 54 which extend into the body and are adhered or otherwise fixedly secured thereto as by a single flat head countersunk screw 50. The forward end of the web 53 has an offset finger 55 extending forwardly thereof while the rear end of the web 53 has an upwardly extending downwardly presenting U-shaped extension 56 which terminates in a locking section 57 from which a safety catch 58 projects. The Y-shaped base element 43 has slots 59 and 61 therethrough, the forward slot 59 receives the finger 55 and the wider slot 61 receives the safety catch 58. The locking section 57 with the safety latch 58 angles outwardly of the web 53 forming a spring catch. The body 41 is secured to the base element by first inserting the finger 55 in the slot 59 and thereafter deflecting the locking section 57 forwardly so that it will pass through the slot 61. The locking section 57 has a reduced width portion 62 which is urged into a notch 63 in the rear wall of the slot 61. The wider portion 64 below the reduced width portion 62 engages the underside of the base element 39 and positively secures the body 41 thereon. Should the portion of reduced width 62 move from the notch 63, the safety catch 58 will prevent the body from being released from the base element.

In FIGS. 12 and 13, another form of lure body 65 is illustrated which is releasably attached to the base element 39 having the slots 59 and 61 therein. The body has the appearance of an elongated worm containing a U-shaped member 66 embedded in its head portion. The member 66 has the forwardly extending finger 55 and the rear latching section 57 with the safety catch 58 which locks the member 66 and body 65 firmly to the base element 39. A hook 67 extends outwardly from the body 65 near the free end thereof connected to a leader 68 which passes through the body and is secured to the member 66 so as to directly connect the hook to the Y-shaped base element 39. The bill 43 in all of the embodiments, above referred to, has a U-shaped wire 69 extending through a pair of transversely spaced holes in the bill portion 43 and secured thereto by having the ends flanged outwardly against the bottom of the bill. This forms a transversely disposed eye to which a fishing line snap and the line 71 is secured in a manner to permit the lure to oscillate more freely sidewardly and to dive to trolling depth.

In FIG. 14, a buoyant elastomeric worm-like body 72 is fixed to the Y-shaped base element 39 by an embedded U-shaped element 73 having protruding end portions 74 which extend through slots 75 in the base element 39 which are bent over to securely anchor the body 72 to the base element.

In FIG. 15 a buoyant elastomeric worm-like body 76 has a plate 77 embedded therein with a pair of apertures by which screws 78 secure the bait 76 to the Y-shaped element 39.

In FIG. 16 a lure body 78 has a plate 79 embedded therein with a flanged finger 81 extending forwardly thereof. The opposite end of the plate has an aperture 82 by which a screw 83 secures the end to the base element 39 after the flanged finger 81 was passed through a slot 84 in the base element. By removing the single screw 83 the body 78 may be removed from the base element 39.

In FIGS. 17, 18 and 19, a further form of the invention is illustrated that wherein the base element 39 has a channel shaped element 85 and to a barbed hook 86 secured thereto by hollow rivets 87. The barbed portion 88 of the hook is disposed centrally of the channel element to project forwardly toward the bill portion 43. The elastomeric worm-like body 89 is retained within the channel element by the barbed end portion 88 over which the forward end portion of the bait is drawn. The barbed end is dull so that the bait may be removed from within the channel element by movement forwardly thereof without damaging the material of the body.

In FIGS. 20, 21 and 22, a still further form of the invention is illustrated that wherein a channel element 91 is secured to the base element 39 by a pair of hollow rivets 87. The channel element 91 is preferably made of plastic with a closed forward end 92. A U-shaped spring element 93 has one portion secured by the rivets 87 within the channel element 91 with the other portion disposed thereabove for receiving and clamping the forward end of a buoyant elastomeric worm-like body 94. The upper portion of the spring element 93 contains a slot 95 into which a locking finger 96 extends from a base section 97 which is embedded within the material of the body 94. When a hook 97 is employed at the end of the body, the leader 68 passes therethrough and is secured to the finger 96, as illustrated in FIG. 21. An inwardly extending finger 98 may be provided on the upper portion of the spring element 93 to secure a live minnow or lure body within the spring and channel elements.

In FIGS. 23 and 24 a still further form of the invention is illustrated, that wherein the base element 99 is the same as the base element 39 with the exception that a single appendage 101 extends downwardly from the rear of the body supporting portion 102 from which the forwardly and downwardly bill portion 103 extends. This single appendage 101 may be employed on all of the base elements 39 of the lures above described in place of the diverging appendages 44 when this is desirable. It was found that a similar action is obtained for the lure when employing the single appendage with a greater rolling but less active sideward oscillation, thereto. The bill portion has an eye 104 which is lanced therefrom and disposed transversely thereof to which the fishline 71 is attached. An elongated body 105 is secured to the base element 99 by screws 106. The body 105 is made of hard buoyant materials such as wood or plastic with an eye 107 in the extending end to which a single or multiple hook 108 is supported. The elongated body 105 slows up the action of the base element 99 or 39 whichever is employed so that the bait can be used for fast trolling or in fast moving water which would produce too much action to the lure of the other figures. The extending end portion limits the gyration and oscillation of the lure and prevents too active movement of the lure in relatively fast water.

Various types of bodies have been illustrated for the lure which basically functions in the same manner when the bodies are attached to the base element 39. The downwardly projecting bill 43 and the buoyance of the body controls the depth at which the lure will operate. The diverging appendages 44 control the oscillating action of the lure as it is drawn through the water.

What is claimed is:

1. In a fish lure, a Y-shaped non-buoyant base element having a bill portion, an arched body supporting portion and a pair of diverging leg-like appendages, the bill and appendages sloping downwardly from said body supporting portion, a one-piece buoyant body secured to the top of said body supporting portion between said appendages and bill, the bottom of the buoyant body being recessed to receive the arched body supporting portion, hook means on the ends of said appendages, and eye means on the bill to which a fish line is attachable.

2. In a fish lure, as claimed in claim 1, an eye on said supporting portion, and hook means secured to said body supporting portion eye.

3. In a fish lure, a base element made of metal having a bill extending forwardly and downwardly from a body supporting portion from which downwardly sloping rearwardly diverging appendage means extends, said body supporting portion having spaced slots, a one-piece buoyant body, a clip having a web portion secured to said body, a forwardly extending finger on said web portion projectable into and through one of said slots, said finger having a terminal portion engaging the bottom side of the base element and a spring latch on said web portion projectable through the other slot for removably locking the clip and body to the top side of the base element.

4. In a fish lure, a base element made of metal having a bill extending forwardly and downwardly from a body supporting portion from which downwardly sloping rearwardly diverging appendage means extends, said body supporting portion having spaced slots, a one-piece buoyant body, a clip having a web portion secured to said body, a forwardly extending finger on said web portion projectable into one of said slots, a spring latch on said web portion projectable through the other slot for removably locking the clip and body to the top side of the base element, said slot for receiving the spring latch having an extending notch of reduced width and said spring latch having a portion reduced in width to extend within said notch.

References Cited by the Examiner
UNITED STATES PATENTS

| | | | |
|---|---|---|---|
| 1,711,200 | 4/1929 | Heddon | 43—42.3 |
| 2,366,456 | 1/1945 | Pheazey | 24—73 |
| 2,486,626 | 11/1949 | Arbogast | 43—42.09 X |
| 2,578,411 | 12/1951 | Fisher | 43—42.09 |
| 2,605,572 | 8/1952 | Holmgren | 43—42.3 |
| 2,618,096 | 11/1952 | Wagner | 43—42.09 X |
| 2,689,992 | 9/1954 | Flora | 24—73 |
| 2,752,721 | 7/1956 | Denny | 43—42.35 X |
| 2,758,408 | 8/1956 | Murphy et al. | 43—42.09 |
| 2,797,519 | 7/1957 | Keller | 43—42.09 X |

SAMUEL KOREN, *Primary Examiner.*
ABRAHAM G. STONE, WARNER H. CAMP,
*Assistant Examiners.*